United States Patent [19]

Rigo et al.

[11] 4,042,785
[45] Aug. 16, 1977

[54] MARKER FOR TELECOMMUNICATION SYSTEM

[75] Inventors: Gualtiero Rigo, Settimo Milanese (Milan); Carlo Alberto Manghi, Rosate (Milan), both of Italy

[73] Assignee: Societa Italiana Telecommunicazioni SIEMENS S.p.A., Milan, Italy

[21] Appl. No.: 657,389

[22] Filed: Feb. 11, 1976

[30] Foreign Application Priority Data

Feb. 12, 1975   Italy .................................. 20179/75

[51] Int. Cl.² ......................................... H04Q 3/42
[52] U.S. Cl. ........................... 179/18 FC; 179/175.2 R
[58] Field of Search ................... 179/175.2 R, 175.23, 179/175.3 R, 18 FC

[56] References Cited

U.S. PATENT DOCUMENTS

| | | | |
|---|---|---|---|
| 2,944,115 | 7/1960 | Henquet et al. ................ | 179/18 FC |
| 3,159,715 | 12/1964 | Abbott ........................... | 179/18 FC |
| 3,217,107 | 11/1965 | Schorum ......................... | 179/18 FC |
| 3,389,229 | 6/1968 | Torisu ............................. | 179/18 FC |
| 3,729,592 | 4/1973 | Buchner ......................... | 179/18 FC |

*Primary Examiner*—Douglas W. Olms
*Attorney, Agent, or Firm*—Karl F. Ross; Herbert Dubno

[57] ABSTRACT

A marker controlling the establishment of connections between local subscriber lines and inter-office links, via an associated line concentrator/distributor, comprises a link allocator, a signalization unit and a service unit. The link allocator responds to requests from a local subscriber line, transmitted via a line finder, or from a remote exchange, arriving over a common signal path, to control the line concentrator/distributor for connecting that local line to an available link or a designated link to a selected line. The signalization unit coacts with a respective two-way coupler in each link, in a time-division mode, to pick up outgoing dial pulses for transmission via the common path and to transmit switching instructions from that path to the engaged subscriber line. The service unit, communicating with both the link allocator and the signalization unit, receives and sends out information relating to possible malfunctions or alarm conditions.

5 Claims, 3 Drawing Figures

MARKER FOR TELECOMMUNICATION SYSTEM

FIELD OF THE INVENTION

Our present invention relates to a telecommunication system, designed to transmit speech and/or data, wherein a multiplicity of local subscriber lines served by a central office are selectively connectable to a lesser number of inter-office links for making outgoing calls to or receiving incoming calls from subscribers served by another central office or exchange.

BACKGROUND OF THE INVENTION

In such a system it is known to employ, at a switching terminal of a central office, a switch marker controlling a line concentrator/distributor which on an outgoing call connects the line of the calling subscriber to an available trunk or other inter-office link and on an incoming call connects a designated link to a selected local subscriber line; see, for example, U.S. Pat. No. 3,328,534. The markers at the intercommunicating terminals are interconnected via a common signal path which carries the information relating to existing or desired connections between a given link and a local subscriber line. The line concentrator/distributor (simply referred to hereinafter as a line concentrator), inserted between $n$ subscriber lines and $m$ links where $m$ is substantially smaller than $n$, comprises a multiplicity of switches whose selective closure thus allows up to $m$ conversations to be carried out simultaneously. The marker, as a central component, communicates with the local lines and the inter-office links through the intermediary of peripheral units such as test circuits and couplers.

In controlling the operation of the line concentrator, the marker must respond to switching signals such as on-hook and off-hook criteria — generally in the form of d-c voltages — picked up at random from the local lines, as well as to corresponding information received via the common signal path which connects it with the marker at the remote terminal. It must also transmit to the distant marker, by way of that signal path, switching information derived from these locally generated signals, including selection signals such as dial pulses transmitted by the calling subscriber to the engaged link once that connection has been established. Since these various tasks are mutually exclusive, they heretofore had to be performed one at a time, with consequent limited operating efficiency, in prior-art systems of this kind.

OBJECT OF THE INVENTION

The object of our present invention, therefore, is to provide an improved marker for the purpose described, designed to perform its duties more effficiently so as to be able to serve a larger number of associated peripheral units.

SUMMARY OF THE INVENTION

A marker according to our invention comprises a link allocator which controls the operation of an associated line concentrator in response to signals from the local lines served by its own terminal and from a signal path leading to a similar marker at a distant terminal. The marker further comprises a signalization unit which communicates with that signal path and with the link allocator for exchanging signals, in a time-division mode, with all the links engaged by the line concentrator.

Pursuant to another feature of our invention, the marker further includes a service unit which is connected to the signal path and to the link allocator in parallel with the signalization unit in order to detect possible malfunctions in a connection sought to be established, with generation of alarm signals which are sent to the local signalization unit, the corresponding unit at the distant marker and, possibly, a manned observation post.

In a preferred embodiment, the signalization unit is split into two subunits, namely a link scanner communicating sequentially with the several links and an access network serving to transmit operating instructions from the link allocator and the marker-connecting signal path to the link scanner and vice versa.

BRIEF DESCRIPTION OF THE DRAWING

The above and other features of our invention will now be described in detail with reference to the accompanying drawing in which.

SPECIFIC DESCRIPTION

Figure 1:
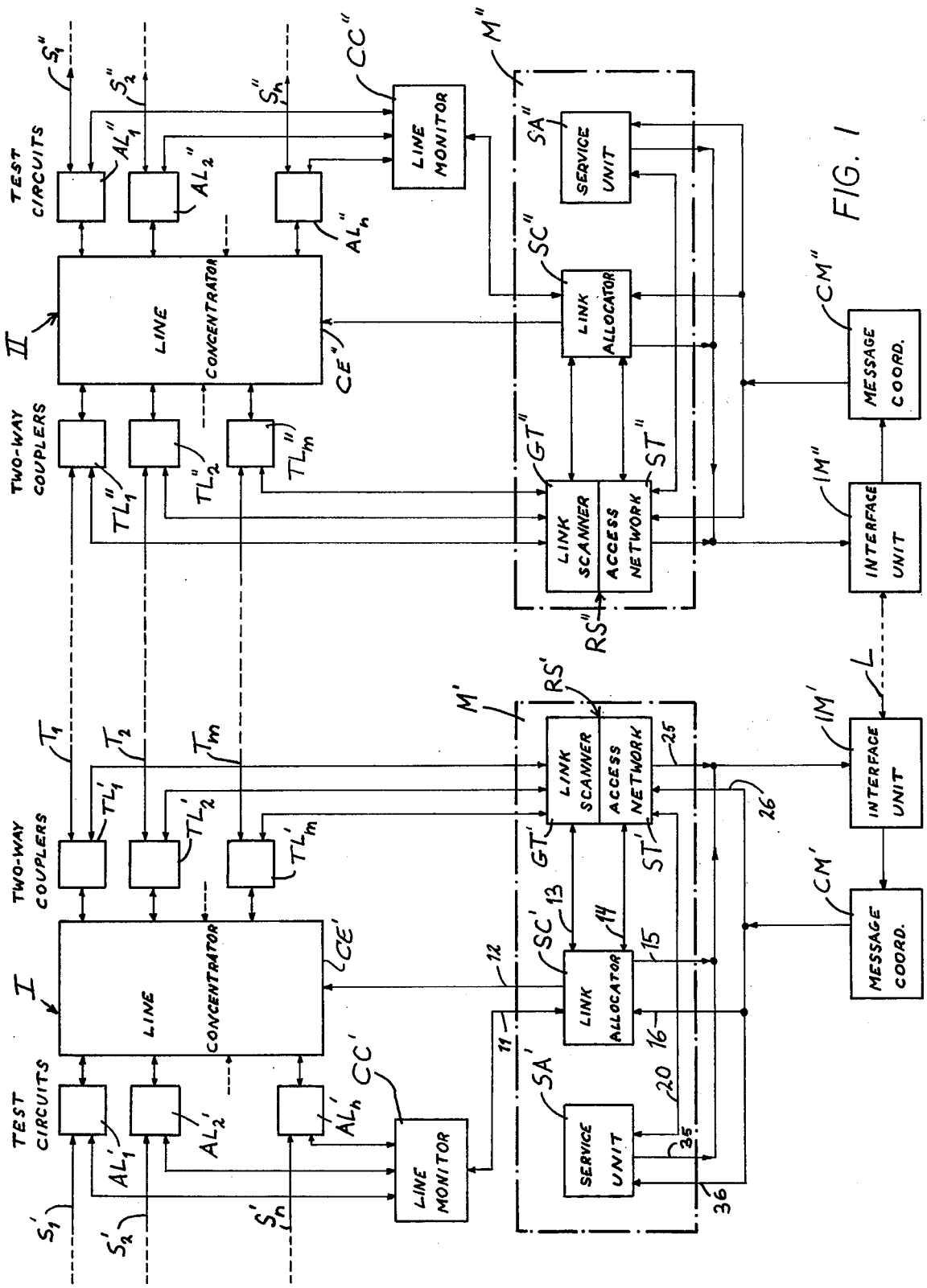
FIG. 1 is a block diagram of a telecommunication system including two terminals each equipped with a switch marker according to our invention.

In FIG. 1 we have shown a telecommunication system for the transmission of speech and/or data between two terminals I and II interconnected by a number of links or trunks $T_1, T_2, \ldots T_m$. Each of these terminals forms part of a central office, not illustrated in detail, serving a multiplicity of local lines $S'_1, S'_2, \ldots S'_n$ and $S''_1, S''_2, \ldots S''_n$ extending to respective subscriber stations not shown, with the number $n$ of subscriber lines exceeding the number $m$ of inter-office links. These links may include conventional means, not further illustrated, for transmitting their messages in a frequency-division mode via respective carriers.

Each terminal comprises a line concentrator CE', CE'' for selectively switching any of the associated local lines to any trunk $T_1 - T_m$ that is available for the calling of a remote subscriber or that has been seized at the remote terminal on a call intended for a specific local subscriber. These line concentrators are controlled by respective switch markers M' and M'' which in turn are interconnected by way of a signal path L common to all the trunks. Signal path L may transmit, in respective time slots of a recurrent scanning cycle, two-way information on the identities of the subscriber lines already connected or sought to be connected to each trunk by the line concentrators CE' and CE'', as is well known per se.

Each subscriber line $S'_1 - S'_n$ and $S''_1 - S''_n$ includes a respective test circuit $AL'_1, AL'_2, \ldots AL'_n$ and $AL''_1, AL''_2, \ldots AL''_n$, the test circuits of each terminal communicating with a respective line monitor CC' or CC'' which, in the case of an outgoing call, transmits the address of the calling subscriber (e.g. a three-digit number) to the associated marker and remains available to the calling line until the same has been connected to a trunk or the call has been aborted. Another section of each line monitor CC', CC'' responds, in the case of an imcoming call, to a subscriber address received from the marker and informs the latter whether the subscriber line so identified is free or busy. In this instance, too, the line monitor remains engaged until the proper connection has been established by the associated line concentrator or the call has been prematurely terminated.

Marker M' is shown connected to signal path L by way of a message coordinator CM' in series with an interface unit IM'. In an analogous manner, path L communicates with marker M" via an interface unit IM" in cascade with a message coordinator CM".

In accordance with our present invention, marker M' comprises a link allocator SC', a signalization unit RS' and a service unit SA'; signalization unit RS' has been subdivided in to a link scanner GT' and an access network ST'. Corresponding elements of marker M" have been designated SC", RS" and SA", which unit RS" again subdivided into two subunits GT" and ST". Since the two identical are indentical, only marker M' will be described in detail hereinafter.

Link allocator SC' communicates via a two-way multiple 11 with line monitor CC', via another two-way multiple 12 with line concentrator CE', and a via similar connections 13 and 14 with the two subunits GT' and ST' of signalization unit RS". An output multiple 15 extends, in parallel with branch multiplies 25 and 35 from access network ST' and service unit SA', to interface unit IM'. An input multiple 16, originating at message coordinator CM', terminates at link allocator SC' in parallel with respective branches 26 and 36 extending to circuits ST' and SA'. There is further shown a two-way connection 20 between these latter circuits.

Link allocator SC', through connection 12, controls the operation of line concentrator CE' in response to requests for a trunk from a calling local subscriber, arriving over connection 11 from line monitor CC', and also in response to instructions from signal path L informing the marker M' that a trunk seized by line concentrator CE" is to be connected to a particular local subscriber line. The latter information, received through the intermediary of interface unit IM', message coordinator CM' and multiple 16, also reaches the units RS' and SA' for the purpose of determining whether the designated trunk operates properly an, if this is not the case, so informing the service unit SA' which thereupon may emit an alarm signal or may signal back to the remote marker for a reidentification of the trunk.

Message coordinator CM' serves to discriminate between imcoming signals destined for units SC', RS' and SA'; it is bypassed for outgoing signals sent to common path L.

The three interconnected but independently operating units SC', RS' and SA' of marker M' include each a read-only memory and an associated random-access memory, the contents of the latter being read and updated by the former whenever the read-only memory is addressed by an external signal.

Figure 2:
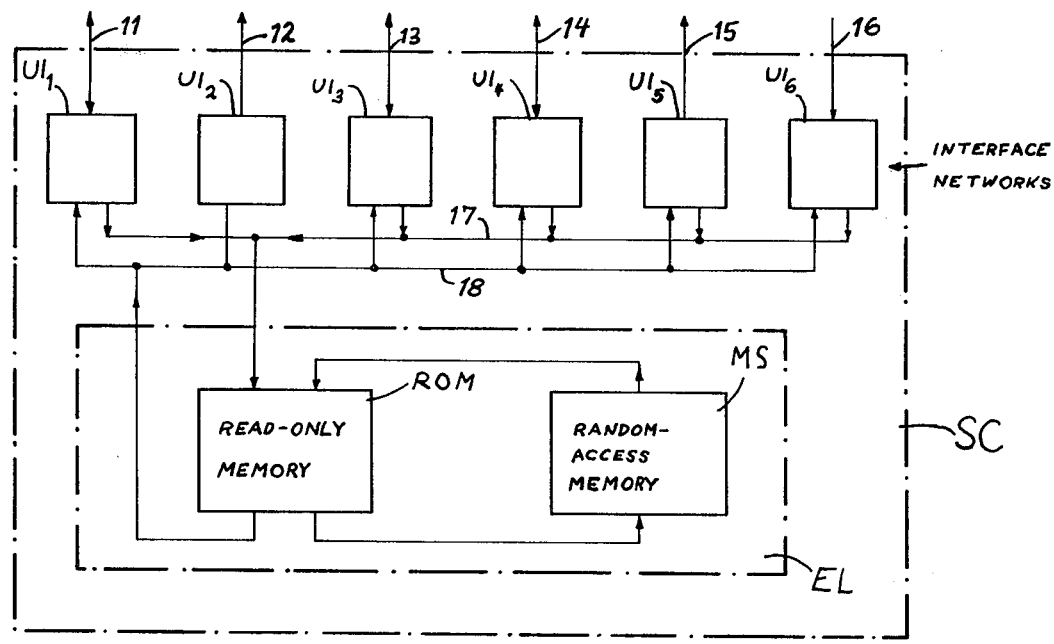
FIG. 2 is a more detailed diagram of a link allocator included in one of the markers of FIG. 1.

As illustrated in FIG. 2, link allocator SC (representative of units SC' and SC" in FIG. 1) comprises a processor EL including a random-access memory ROM with an input bus 17 and an output bus 18, the two multiples 17 and 18 communicating with the external circuits 11 – 16 by way of respective interface networks $UI_1$ - $UI_6$. An external signal arriving at multiple 17 by way of any of these interface networks addresses a stage of memory ROM which also receives information from a corresponding stage of memory MS, that information concerning the current state of the voice or data connection to which the received signal relates. Memory ROM thereupon emits a switching instruction, by way of multiple 18 and one or more of the interface networks $UI_1$ - $UI_6$, to the appropriate marker unit or units and simultaneously updates the contents of the respective stage of memory MS. Units $UI_1$ – $UI_6$ serve to translate the external signals into binary words and vice versa.

The construction of service unit SA' or SA" is generally similar to that of link allocator SC and need therefore not be further described.

Figure 3:
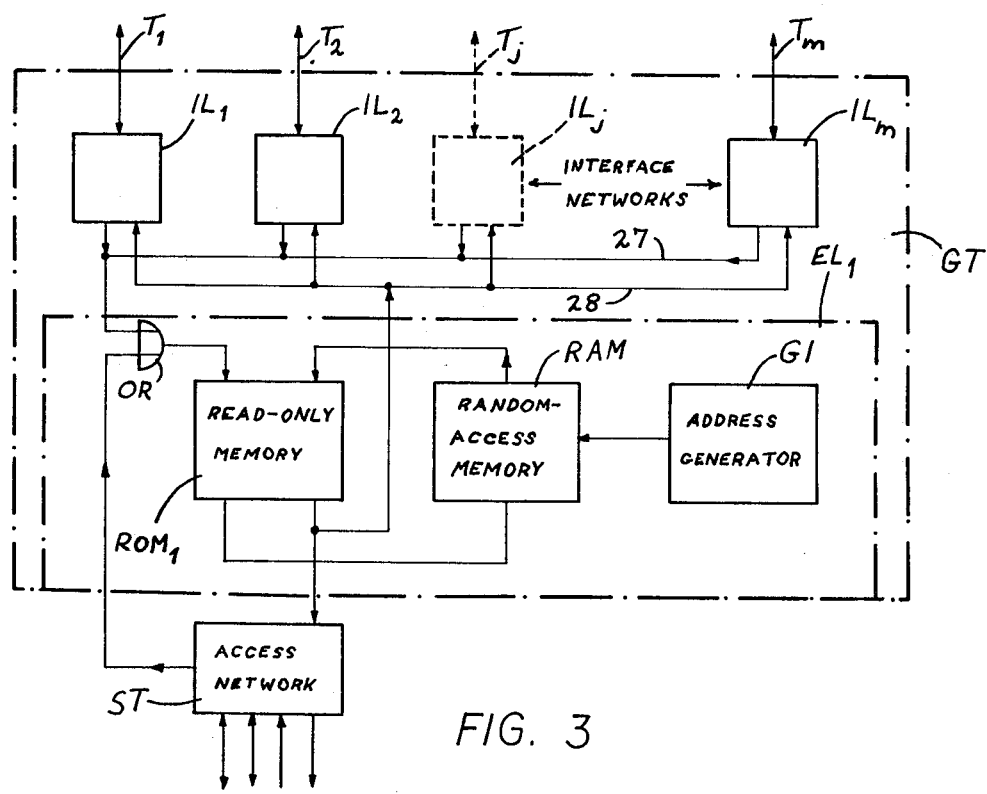
FIG. 3 is a similar diagram of a signalization unit also included in the marker.

In FIG. 3 we have shown details of a link scanner GT, representative of subunits GT' and GT", together with an associated access network ST. Scanner ST comprises a set of m interface networks $IL_1, IL_2, \ldots IL_j, \ldots IL_m$ respectively communicating with several trunks $T_1, T_2, \ldots T_j, \ldots T_m$. A processor $EL_1$ comprises a read-only memory $ROM_1$, an associated random-access memory RAM and an address generator GI, this generator successively enabling the stages of memory RAM in respective time slots of a recurrent time-division-multiplex cycle to be read and updated by memory $ROM_1$. The latter is addressable, via a logical summing circuit OR, from an input bus 27 as well as from access network ST. Input bus 27 and an output bus 28, fed in parallel with network ST by memory $ROM_1$, are each connected in parallel to the several interface networks $IL_1$ - $IL_m$.

At a given instant of a TDM cycle, when generator GI calls out the address of a trunk $T_j$, the corresponding network $IL_j$ is given access to the respective stage of memory RAM via memory $ROM_1$ to receive a switching instruction elicited by a signal from network ST or, conversely, to transmit such an instruction to that network in response to a signal from the trunk.

The connection 13 between scanner GT and link allocator SC illustrated in FIG. 1, serves for the exchange of ancillary information including sychronizing signals between the circuits and has not been illustrated in FIGS. 2 and 3.

Service units SA' and SA" respond to inconsistencies between signals arriving via path L and information received from the trunks by way of couplers $TL'_1$ – $TL'_m$ or $TL"_1$ – $TL"_m$. They may also be controlled by testing equipment of the type disclosed in commonly owned applications filed on even date herewith by Franco de Marco and Gualtiero Rigo, Ser. No. 657,263, and by Giorgio Biraghi and Carlo Manghi, Ser. No. 657,388, these disclosures being hereby inserted by reference into our present application.

The circuitry hereinabove described may be used in a telecommunication system with hot-line connections, i.e. with markers programmed to connect a certain subscriber line of one terminal invariably with a specific subscriber line of another terminal, as disclosed and claimed in commonly owned application Ser. No. 440,450 filed Feb. 7, 1974 by Luigi Falcone. For the construction and mode of operation of conventional markers, further reference may be made to U.S. Pat. No. 3,597,544.

We claim:

1. In a telecommunication system with at least two terminals interconnected by a plurality of links, each terminal serving a number of local lines larger than said plurality and being provided with a line concentrator for selectively connecting any local line to any link under the control of a marker communicating via a signal path with a marker of the other terminal, the improvement wherein each marker comprises:

a link allocator responsive to signals from said local lines and from said signal path for controlling said line concentrator for engaging a link to be connected to a local line; and a signalization unit communicating with said link allocator and with said signal path for exchanging signals in a time-division mode with all links engaged by said line concentrator;

said link allocator and said signalization unit including each a read-only memory and an ancillary memory, said read-only memory being jointly controlled by received instructions and data stored in said ancillary memory for reading out information and updating the contents of said ancillary memory.

2. The improvement defined in claim 1 wherein said links are provided with respective two-way couplers, said signalization unit including a link scanner sequentially connectable to said couplers and an access network for transmitting operating instructions from said link allocator and said signal path to said link scanner and vice versa.

3. The improvement defined in claim 1 wherein said local lines are provided with respective test circuits connected to a common line monitor, said link allocator communicating with said local lines via said line monitor.

4. The improvement defined in claim 1 wherein said link allocator and said signalization unit comprise each a read-only memory and an ancillary memory, said read-only memory being jointly controlled by received instructions and data stored in said ancillary memory for reading out information and updating the contents of said ancillary memory.

5. The improvement defined in claim 1 wherein said signalization unit further comprises an address generator connected to the ancillary memory thereof for cyclically giving access to different memory stages assigned to respective links.

* * * * *